US010661876B2

(12) United States Patent
Cafaro et al.

(10) Patent No.: US 10,661,876 B2
(45) Date of Patent: May 26, 2020

(54) SYSTEM AND METHOD FOR CONTROLLING INFORMATION REPRESENTATIVE OF THE USE BY ONE OR MORE USERS OF ONE OR MORE HABITABLE LOCATIONS OF A SHIP (71) Applicant: FINCANTIERI S.P.A., Trieste (IT)

(72) Inventors: Gabriele Maria Cafaro, Trieste (IT); Fabio Benevolo, Trieste (IT); Alessandro Trotta, Trieste (IT); Daniel Celotti, Trieste (IT)

(73) Assignee: FINCANTIERI S.P.A. (IT)

( * ) Notice: Subject to any disclaimer, the term of this patent is extended or adjusted under 35 U.S.C. 154(b) by 35 days.

(21) Appl. No.: 15/750,256

(22) PCT Filed: Aug. 31, 2016

(86) PCT No.: PCT/IB2016/055188
§ 371 (c)(1),
(2) Date: Feb. 5, 2018

(87) PCT Pub. No.: WO2017/042663
PCT Pub. Date: Mar. 16, 2017

(65) Prior Publication Data
US 2018/0229827 A1 Aug. 16, 2018

(30) Foreign Application Priority Data
Sep. 7, 2015 (IT) .......................... 102015000048991

(51) Int. Cl.
F24F 11/86 (2018.01)
B63J 2/04 (2006.01)
(Continued)

(52) U.S. Cl.
CPC .................. B63J 2/04 (2013.01); B63B 29/02 (2013.01); G05B 15/02 (2013.01);
(Continued)

(58) Field of Classification Search
CPC ................................................. F24F 11/0086
(Continued)

(56) References Cited

U.S. PATENT DOCUMENTS 9,361,630 B1* 6/2016 Goswami ........... G06Q 30/0267
2011/0153032 A1* 6/2011 Klok ....................... G08C 17/02
700/12

(Continued)

FOREIGN PATENT DOCUMENTS

EP 1463219 A1 9/2004
WO 2015130786 A1 9/2015
WO 2015157628 A2 10/2015

OTHER PUBLICATIONS

International Search Report for PCT/IB2016/055188 dated Nov. 15, 2016.

(Continued)

Primary Examiner — Suresh Suryawanshi
(74) Attorney, Agent, or Firm — Thomas | Horstemeyer, LLP (57) ABSTRACT System and method for controlling representative information about the use by one or more users of one or more habitable locations of a ship, comprising: a plurality of habitable locations, each habitable location comprising a plurality of electrical and/or electronic components controllable during the use of the habitable location by a user; a plurality of local control units, each local control unit of said plurality being operatively associated with at least one portion of habitable locations of the plurality of habitable locations of the ship, each local control unit being configured to control said at least one portion of habitable locations to which it is operatively connected; a central control unit; a data communications network, each local control unit of said plurality being operatively associated with the central control unit via the data communications network.

11 Claims, 4 Drawing Sheets (51) Int. Cl.
 *B63B 29/02* (2006.01)
 *G05B 15/02* (2006.01)
 *B63B 35/00* (2020.01)

(52) U.S. Cl.
 CPC .............. *B63B 2035/004* (2013.01); *G05B 2219/2614* (2013.01); *G05B 2219/2642* (2013.01)

(58) Field of Classification Search
 USPC ........................................................ 700/276
 See application file for complete search history.

(56) References Cited

U.S. PATENT DOCUMENTS

| | | | | |
|---|---|---|---|---|
| 2013/0345908 | A1* | 12/2013 | Dorr | G05B 23/0235 701/4 |
| 2014/0001846 | A1* | 1/2014 | Mosebrook | H04L 12/2816 307/11 |
| 2015/0005927 | A1* | 1/2015 | Makrinus | B64D 9/00 700/228 |
| 2017/0013415 | A1* | 1/2017 | Sigal | H04W 8/005 |

OTHER PUBLICATIONS

Honeywell Europe—OEM Solutions—HVAC Applications—cruise ships, Sep. 5, 2015, URL: https://web.archive.org/web/20150905090109/http://ecc.emea.honeywell.com/oem/hvac/applications/cruise_ships.htm.

Excel 10 Fan Coil Unit Controllers LNS Plug-Ins Honeywell Excel 5000 Open System, Sep. 1, 2009, URL: https://web.archive.org/web/20110812084918/http://products.ecc.emea.honeywell.com/europe/pdf/en2b0285-ge51r0909.pdf.

Excel 50/500/800 Lonworks TM Mechanisms Honeywell Excel 5000 Open System Interface Description, Aug. 1, 2012, URL: https://web.archive.org/web/20151129065107/https://products.ecc.emea.honeywell.com/europe/pdf/en0b0270-ge51r0812.pdf.

* cited by examiner

SYSTEM AND METHOD FOR CONTROLLING INFORMATION REPRESENTATIVE OF THE USE BY ONE OR MORE USERS OF ONE OR MORE HABITABLE LOCATIONS OF A SHIP

CROSS-REFERENCE TO RELATED APPLICATION

This application is the 35 U.S.C. § 371 national stage application of PCT Application No. PCT/IB2016/055188, filed Aug. 31, 2016, where the PCT claims priority to and the benefit of, IT Patent Application No. 102015000048991, filed Aug. 31, 2016, both of which are herein incorporated by reference in their entireties.

This invention relates to the naval sector, in particular to a system and method for controlling information representative of the use by one or more users of one or more habitable locations of a ship.

As is known, the cabins of a cruise ship are now equipped with electrical and electronic devices to ensure a home automation comfort as adequate and responsive as possible to the passengers' expectations.

Such electric or electronic devices range from sensors and actuators for opening/closing doors or windows, turning on/off lights and/or appliances (TV, radio), regulating the air conditioning, and so on, to interfaces for communicating requests to the ship's personnel, for example to request service in the cabin or simply its tidying up.

Nowadays, in the naval sector, a key aspect is to be able to provide passengers a cruise service that is ever more efficient and valid.

In this regard, it is essential to be able to equip each cabin, or in general each habitable location of the ship, with all the necessary amenities, therefore, also with all the aforesaid electric or electronic devices.

However, this can involve definitely higher costs in terms of installation, maintenance and energy consumption.

In light of this, there is a strongly felt need to be able to monitor the user's use of his cabin and thus the use of such devices in order to determine the actual habits, choices and behaviours of passengers in order to optimise the distribution of such devices.

The purpose of this invention is to devise and make available a system for controlling information representative of the use by one or more users of one or more cabins, in general of one or more habitable locations of a ship, which allows at least partially eliminating the drawbacks complained of with reference to the technique and in particular that allows optimising costs while still providing an adequate level of cruise service.

This purpose is achieved by means of a system according to claim 1.

This invention also regards a method for controlling information representative of the use by one or more users of one or more cabins and, more generally, one or more habitable locations of a ship.

Further characteristics and advantages of the system and related method according to the invention will result from the following description of preferred embodiments, provided as non-limiting examples, with reference to the accompanying figures, in which.

With reference to the above figures, reference number 100 indicates, in its entirety, a system for controlling information representative of the use by one or more users of one or more habitable locations of a ship, hereinafter solo control system or simply system, according to the invention.

For the purposes of this present description, use, by a user, of one or more habitable locations of a ship means both the simple occupation of such location and the use of the services and amenities in the habitable location through any home automation command that can be given through the use of electric and/or electronic devices (examples of which will be provided below) distributed inside, outside or in the vicinity of the habitable location.

Figure 1:
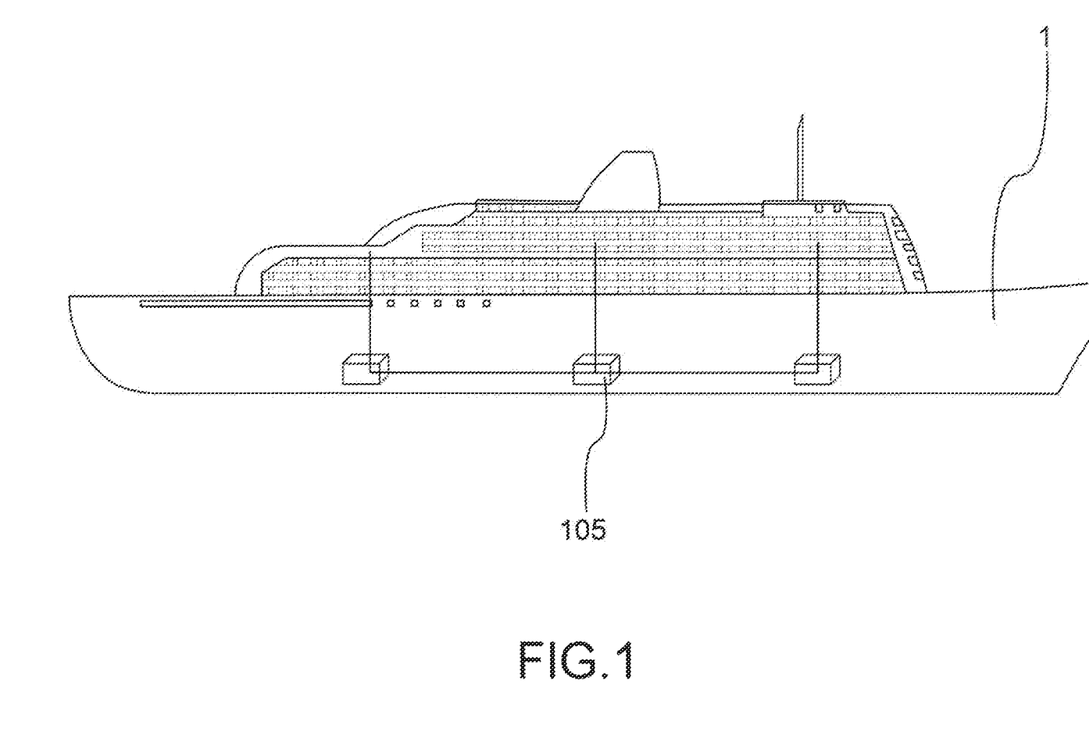
FIG. 1 schematically illustrates an example of a ship and a data communication network usable in the control system of this invention.

An example of ship, indicated in its entirety by reference number 1, is illustrated in FIG. 1.

For the purposes of this description, ship means any vessel usable for cruise, recreation and tourism services, for example, a cruise ship, such as that illustrated in FIG. 1.

Figure 2:
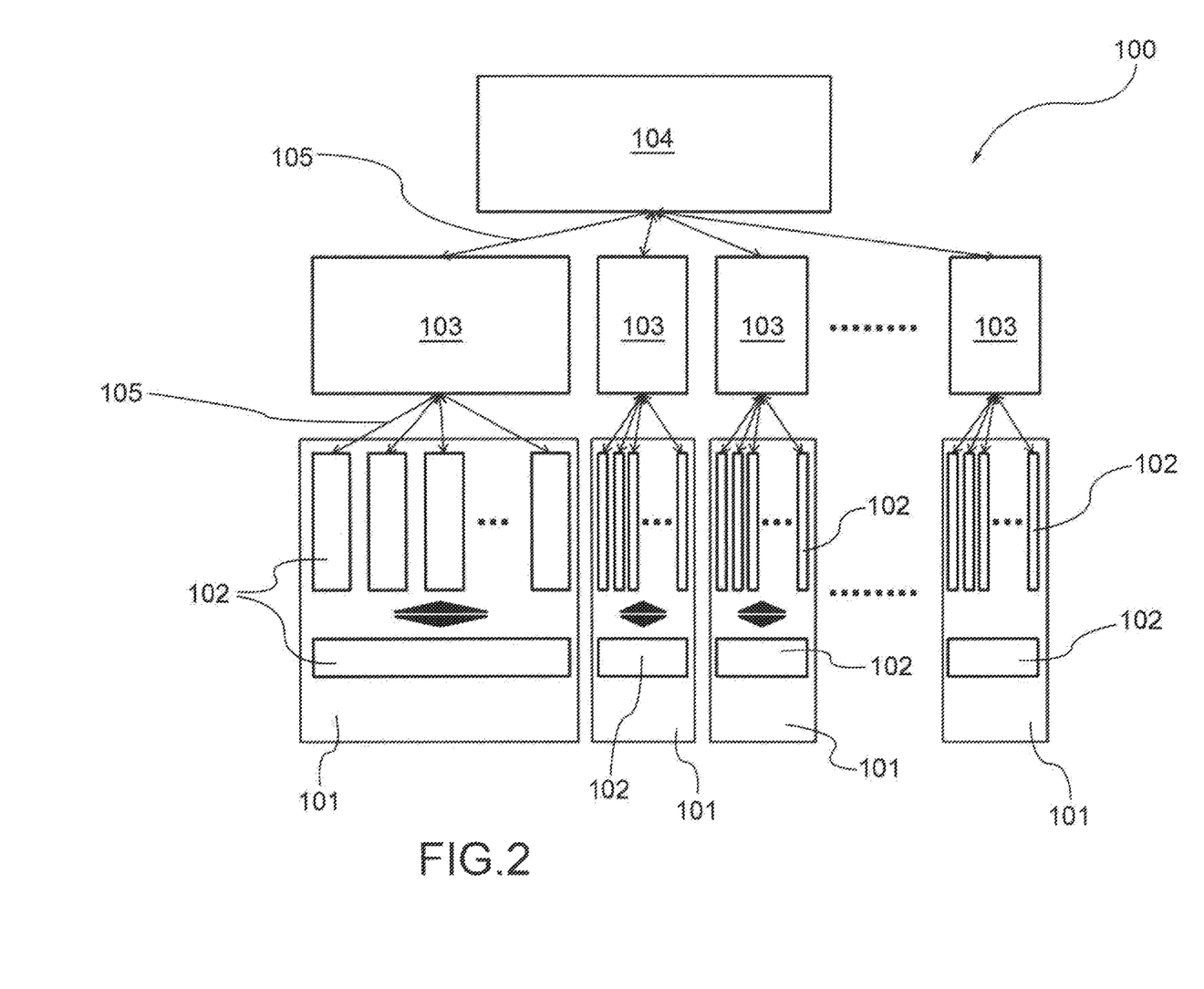
FIG. 2 is a block diagram illustrating a control system according to an embodiment of the invention.

With reference now also to FIG. 2, the system 100 comprises a plurality of habitable locations 101.

For the purposes of this description, habitable location of a ship means any space of a ship, indoors or outdoors, in which a user may stay (as a passenger or crew member), even only temporarily, for example, a cabin, restaurant, theatre, casino, ballroom, gym, spa, control room, engine room, and so on.

Each habitable location comprises a plurality of electrical and/or electronic components 102 controllable during the use of the habitable location by a user.

In greater detail, the plurality of electrical and/or electronic components 102 comprises a plurality of sensor nodes and a plurality of actuator nodes.

The plurality of sensor nodes includes temperature sensors, presence sensors, brightness sensors, humidity sensors, current sensors, flow sensors, pressure sensors, magnetic sensors, position sensors, and so on.

The plurality of actuator nodes comprises motors/servo motors and/or digital devices or lighting and electromechanical/electrohydraulic systems, or acoustic speakers and/or transducers.

Figure 3:
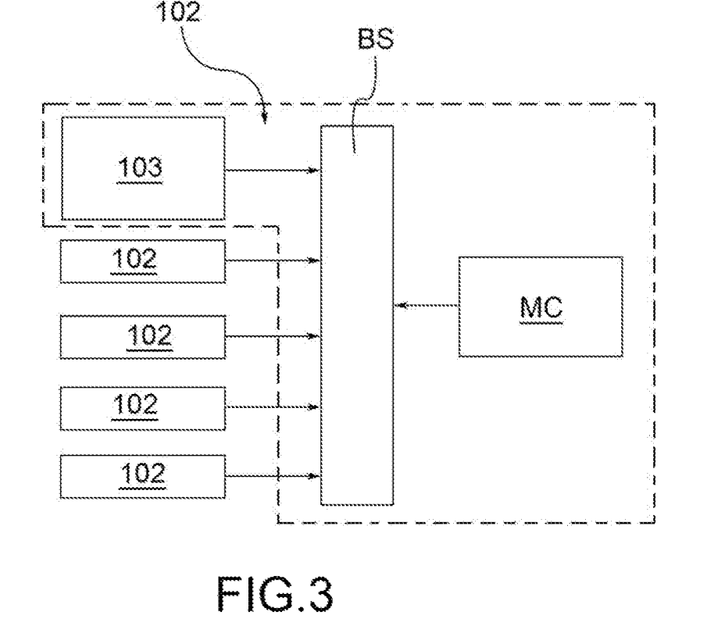
FIG. 3 is a block diagram illustrating a component of the control system of FIG. 2.

With reference to FIG. 3, each node 102 preferably comprises inside it a microcontroller MC powered by battery or wired DC voltage.

In each node, whether it is a sensor or actuator node, the microcontroller MC is configured to execute a respective local program code CPL (for example, firmware) in order to collect and store data representative of the signals detected by the sensors and the electrical actuation signals of the commands on the basis of an independent internal logic.

In addition, the microcontroller of each node is configured, by means of this local program code, to transmit to a local control unit (described below) the detected data and to manage the actuator nodes present in the habitable location (for example, the cabin).

In addition to the microcontroller MC, FIG. 3 also shows the data communication bus BS with which each node 102 is equipped to communicate with the local control unit 103 of the habitable location 101 of which the node 102 is part, to receive and communicate data with the other nodes, and to receive commands from the other actuator nodes, all indicated by the reference number 102.

It should be noted that, in the same habitable location, the plurality of sensor nodes, the plurality of actuator nodes can be operatively connected to each other in a wired or wireless manner.

Furthermore, the plurality of electrical and/or electronic components 102 of each habitable location is operatively connected to a local control unit, described below, operatively associated to the habitable location, and to a central control unit, also described below, so that the collected data is sent to the central control unit and the plurality of individual nodes are in turn controlled and monitored by the central control unit.

It should be noted that the communication to and from the individual nodes is based on IoT ("Internet of Things") concepts.

In fact, each habitable location comprises the possibility of integrating communication protocols based on various technologies such as, for example, NFC, Wi-Fi, RFID, Zigbee, Bluetooth and RF technology, etc.

Returning to the diagram of FIG. 2, the system 100 further comprises a plurality of local control units 103.

Each local control unit 103, already mentioned previously, of said plurality is operatively associated with to at least a portion of habitable locations 101 of the plurality of habitable locations 101.

In an embodiment, said at least one portion of the habitable locations 101 of the plurality of habitable locations 101 of the ship 1 to which is associated a local control unit 103 is an individual habitable location, for example a cabin.

According to a further embodiment, alternatively or in combination with the preceding, said at least one portion of habitable locations 101 of the plurality of habitable locations 101 of the ship 1 to which is associated a local control unit 103 comprises one or more reference zones of the ship 1, comprising more than one habitable location 101.

For example, a local control unit 103, for example a microprocessor or microcontroller, also called a Gateway, can be associated with a plurality of cabins, distributed in a specific reference zone of the ship 1 to which the local control unit 103 is dedicated, for example the cabins of a specific wing or deck.

The position of a local control unit 103 also advantageously provides resilience in case of failure of the connections to the central control unit (described below), thus allowing the use of a sub-set of basic necessary functions.

Each local control unit 103 can be a microcontroller with ARM/Atom chipset or similar, with a Linux-like operating system, one or more programming tools and specific software applications.

The local control unit 103 is the contact point between a habitable location (for example, a cabin) and the central control unit and the user (passenger) himself.

In fact, the latter, through a specific software application (APP) developed specifically for use on portable (tablets or smartphones) or fixed (touch screen PC) electronic devices, is able to control the habitable location (for example, the cabin), request/order services, and so on.

In other words, the system 100 further comprises at least one user's portable electronic device, for example a smartphone/tablet, configured to manage the individual habitable environment (for example, the cabin) and to manage requests for the ship's services available to passengers. The software application available to a user, installed on the portable electronic device, is representative of a user interface for the management of the individual cabin and for managing requests for the ship's services available to passengers.

This software application is customisable by the purchaser, for example, the cruise company, which can develop it based on the needs of passengers before and during the use of the cruise services.

It should be noted also that, according to further embodiments, other software applications can be provided for user electronic devices (smartphones and/or tablets) for the control of certain specific functions such as, for example, the control of the BLE-interface lock.

In this regard, the system 100 includes the use of a specific software application (APP), integrated into the habitable location 101, with an N-digit PIN to access the habitable location 101 through the use of a smartphone and/or tablet that uses the BLE (Bluetooth Low Energy) protocol.

According to other embodiments, other services provided can be services for the full interaction with the cruise experience (for example, ship chat, personalised event calendar with reservation services, and so on).

In addition, according to a further embodiment (not shown in the figures), the system 100 can comprise a "media device" control sub-system based on a Linux-like operating system.

In more detail, this sub-system comprises a client computer configured to receive data or multimedia content from both an external central memory unit (also described below) or from an internal memory unit.

In fact, with the aid of such data, in this embodiment, it is possible to interface the client computers with IPTV systems, or with simple file managers such as SMB, and so on, in addition to allow the reception of audio content using the A2DP protocol from any enabled device.

In addition, the client computer can be operatively connected in a modular manner, based on the needs, to an audio output system and to a video output system. The "media devices" can also be controlled remotely in real-time and safely.

Returning to the embodiment of FIG. 2, it should be noted that each local control unit 103 is advantageously configured to control said at least one portion of habitable locations 101 to which it is operatively connected.

In this regard, the functions managed by each local control unit can be, for example, in the case where the habitable location is a cabin, the following:

light control: turning on and off and dimming;
control of the HVAC (Heating, Ventilating and Air Conditioning): turning on and off and adjusting the temperature and speed of the air flow;
curtain control: opening and closing;
access control: to be performed by means of a passive device (TAG) or smartphone (with the N-digit pin);
control of night lights: turning cabin guide lights on and off based on the presence of movement of the passengers;
control of furnishing objects for a more immersive experience of the cabin;
monitoring the status of the cabin, detecting environmental parameters (temperature, light, and so on) in each zone and detecting consumption;
bidirectional dialogue with a central control unit, logging the parameters and intervening with external commands to change the status of the cabin or reference zone in the case of need;
activation of several field characteristics simultaneously or interfacing with the higher level, for example the "ship" system;

activation of environmental lights and curtains, audio/video equipment, and furnishings controlled based on pre-sets;

interfacing the audio/video system provided in the cabin with external devices;

use of a panel interface to check the status of the entire cabin, the panel interface can be a user's mobile electronic device configured with a dedicated software application;

requests to the outside, such as, for example: requests for assistance for hotel services; requests for drinks in the cabin; requests for purchases of ship objects;

social interface: integration of a messaging system between cabins or between cabin and the higher-level system, for example the "ship" system;

event interface: displaying entertainment events on the ship.

The system 100 also comprises a central control unit 104, already mentioned previously and described below.

It should be noted that each local control unit 103 is configured to detect from said plurality of electrical and/or electronic components 102 information representative of the use by a user of the habitable location.

Furthermore, each local control unit 103 is configured to provide the central control unit 104 with information representative of the use by a user of the habitable location 101 detected, by the local control unit 103, of said plurality of electrical and/or electronic components 102.

The system 100 also comprises a data communication network 105 (shown schematically in both FIG. 1 and FIG. 2).

The data communication network is, for example, a LAN (Local Area Network) distributed throughout the ship 1, either wired or wireless.

From a conceptual point of view, the data communication network 105 comprises local portions having a network ring conformation for each habitable location (for example, a cabin) and/or a more granular local zone (for example, the cabins of a same wing or deck of the ship) and a main portion having a network ring conformation distributed at a main or higher level (for example, at the level of the ship 1) with respect to the local portions.

The local portions of the data communication network 105 are, in turn, interconnected by the main portion of the data communication network 105.

Returning now to the system 100 of FIG. 2, it should be noted that each local control unit 103 is operatively associated with the central control unit 104 via the data communication network 105.

Furthermore, the plurality of electrical and/or electronic components 102 of each habitable location 101 is operatively connected to the local control unit 103 of the respective habitable location 101 via the data communication network 105.

With reference now to the central control unit 104, it is advantageously configured to store said information representative of the use by a user of the habitable location 101 received from each local control unit 103 of said plurality of local control units 103 associated with a habitable location 101 of the ship 1.

Furthermore, the central control unit 104 is advantageously configured to generate information representative of the status of said at least one portion of habitable locations 101 of the plurality of habitable locations 101 on the basis of the stored information representative of the use by a user of said at least one portion of habitable locations (101) of the plurality of habitable locations 101.

In particular, the information representative of the status of the at least one portion of habitable locations 101 can be represented graphically (ship, deck, rooms, halls, etc.) and display in real-time the situation and changes of the status of the habitable location.

In an embodiment, the central control unit 104 is advantageously configured to generate in real-time the stored information representative of the use by a user of the habitable location 101.

Figure 4:
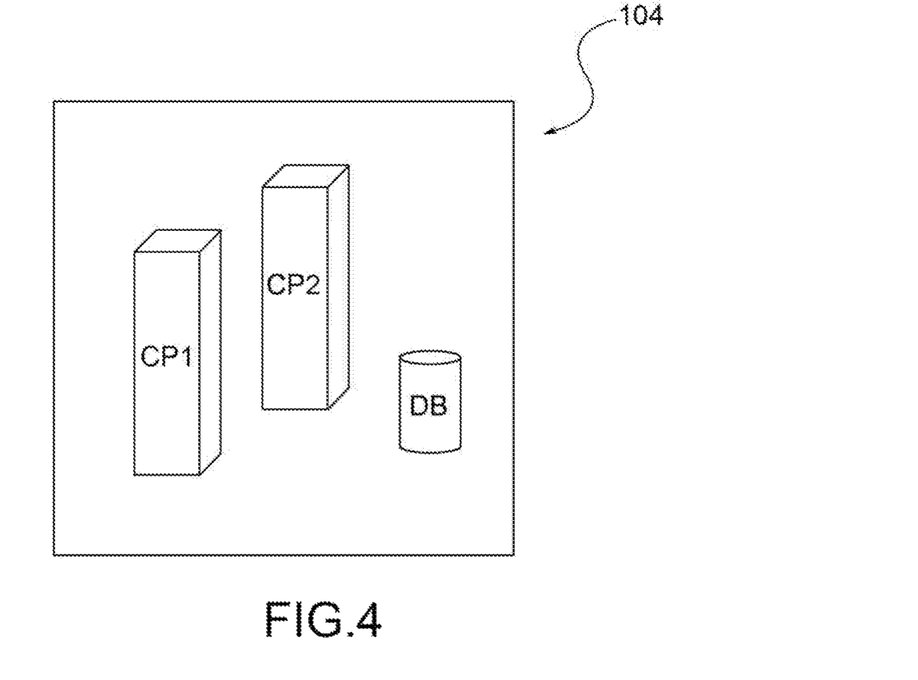
FIG. 4 is a block diagram illustrating a further component of the control system of FIG. 2.

In more detail, with reference also to FIG. 4, the central control unit 104 is based on a physical and/or virtualised computer infrastructure with suitable physical and/or virtual servers dedicated to a first program code or first application CP1 and a second program code or second application CP2, properly balanced between them and redundant.

The central control unit 104, thanks to the first program code CP1 and to the second program code CP2, is configured to allow the plurality of electrical and/or electronic components 102 of each habitable location 101, each local control unit 103 and any further service/system on the system 100, and thus on the ship 1, suitably interfaced, to communicate data with each other.

The infrastructure and the underlying first application code CP1 supports the entire system 100 with the related management mechanics of command/messages in broadcasting/listening mode.

The central control unit 104 further comprises a memory unit or database DB in which the data exchanged, i.e., the information representative of the use by a user of the habitable location 101 received from each local control unit 103 of said plurality of local control units 103 associated with a habitable location 101 of the ship 1, is suitably stored in real-time, so that a database of real-time persistence is created.

The central control unit 104 is also configured, by means of the second program code CP2, to make such information available to third parties, such as the cruise company, for suitable analysis and subsequent top-down actions.

It should be noted also that, in an embodiment, the central control unit 104 is advantageously configured to send commands to each local control unit 103 to control said at least one portion of habitable locations 101 to which the local control unit 103 is operatively connected.

Figure 5:
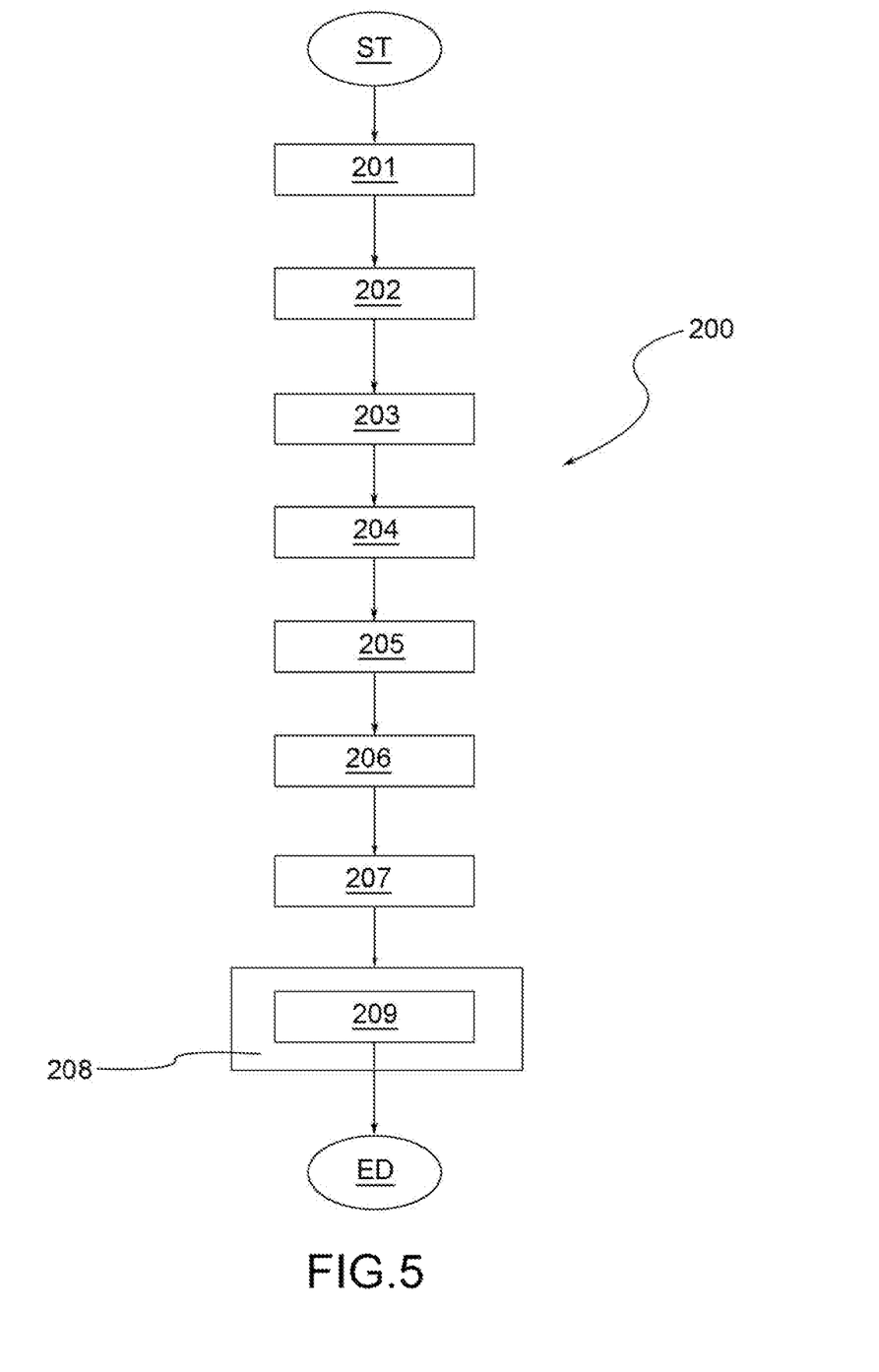
FIG. 5 is a block diagram illustrating a control method according to an embodiment of the invention.

With reference now also to the block diagram of FIG. 5, we will now describe a method for controlling information representative of the use by one or more users of one or more habitable locations of a ship, hereinafter also simply control method or method.

The method, indicated in its entirety by reference number 200, comprises a symbolic step of starting ST.

The method 200 comprises a step of providing 201 a plurality of habitable locations 101, each habitable location comprising a plurality of electrical and/or electronic components 102 controllable during the use of the habitable location by a user.

The plurality of habitable locations 101 and the plurality of electrical and/or electronic components have been defined and described above.

The method 200 further comprises a step of providing 202 a plurality of local control units 103, each local control unit 103 of said plurality being operatively associated with at least one portion of habitable locations 101 of the plurality of habitable locations 101 of the ship 1.

Even the plurality of local control units 103 has been defined and described above.

The method 200 also comprises a step of providing 203 a central control unit 104.

The method 200 also comprises a step of providing 204 a data communication network 105, each local control unit 103 of said plurality being operatively associated with the central control unit 104 via the data communication network 105.

The method 200 also comprises a step of detecting 205, by a local control unit of said plurality of local control units 103, information representative of the use by a user of the habitable location from said plurality of electrical and/or electronic components 102.

The method 200 also comprises a step of providing 206, by a local control unit 103 of said plurality of local control units 103, information representative of the use by a user of the habitable location detected by said plurality of electrical and/or electronic components to the central control unit 104.

The method 200 also comprises a step of storing 207, by the central control unit 104, the information representative of the use by a user of the habitable location 101 received from each local control unit 103 of said plurality of local control units 103 associated with a habitable location 101 of the ship 1.

The method 200 also comprises a step of generating 208, by the central control unit 104, information representative of the status of a habitable location 101 on the basis of the stored information representative of the use by a user of the habitable location 101.

In an embodiment, the step of generating 208 comprises a step of generating 209 in real-time, by the central control unit 104, the stored information representative of the use by a user of the habitable location 101.

Furthermore, the step of generating 208 comprises a step of making available, by the central control unit 104, such information to third parties, for example the cruise company, for suitable analysis and subsequent top-down actions, such as, for example, the management of automation policies of the ship 1, in real-time.

The method 200 comprises a symbolic step of ending ED.

As can be seen, the purpose of the invention is achieved in that the control system (and the related method) described allow obtaining, even in real-time, information representative of the use, by one or more users, of a habitable location of the ship, for example a cabin.

In this way, it is possible for the cruise company to understand, first, which electrical and/or electronic devices are more frequently used by the users than others and/or which services among those offered by the cruise service are more requested than others.

In this way, from an architectural point of view, it will be possible to best optimise the number and the type of electrical and/or electronic devices with which to equip the individual cabins, and, from a commercial point of view, to carefully assess how to change the cruise service offered based on the needs and expectations of the passengers.

The fact of being able to know such information in real-time allows, among other things, being able to change or offer different services already during the cruise itself.

Moreover, the fact of having applied the control system (and related method) according to this invention on board a cruise ship allows interfacing the sensory experiences, expectations and requests of users with the broad availability of services and amenities available through the integration of data communication protocols from the passenger cabins and other zones of the ship with the operational central control unit provided to the cruise company on board ship.

At the lowest logical level, the system is configured to use a basic interfacing logic (analogue, digital signals) used by the majority of the microcontrollers currently on the market.

This logic allows a wide range of applications and controls in many technological areas.

The system therefore provides a flexible, fast, and easy method to use for making the control of the devices and equipment in the cabin comfortable and safe and considerably increasing cruise comfort, by applying it at the lowest granular level of the subdivision of the ship structure, such as the cabin, allowing its management and control.

At an intermediate logical level, a conceptual component is inserted that allows the user, and thus the cabin, to communicate with the "ship" system.

With this logical component, the low-level systems (cabins) are connected to the outside and thus allow for example the passenger in the cabin to order/request services to the room/user, thus integrating the hotel component.

At the base of the management of these communications, the model can be modulated so that it adapts to the needs of the cruise company, either through a simple interface or by replacing systems that are already present.

At the highest logical level, the system comprises the central management control unit of the "ship" through the monitoring and reading of the information collected at the lowest logic level, as described previously.

In fact, through a synoptic panel of the decks and thus of the ship, it will be advantageously possible to analyse, in top-down logic, on the basis of the data collected and stored by the central control unit, the individual event recorded by the individual sensors/actuators present at the lowest logical level.

The preferred configuration provides for a cabin with two-zone structure (dual-zone cabin), with independent management of the actuators and independent readings of the sensors positioned in the two zones.

The system (and related method) according to the invention allow improving the offer of products, maximising the time useful for fully "experiencing" the cruise and monitoring and tracking the passenger.

In particular, the offer of products can regard entertainment programs.

In fact, the time spent in the cabin represents a significant percentage of the time spent on a cruise. The entertainment services have undergone significant evolution in terms of the increase of the offer and a greater offer available to the passenger, with a view to meet the liking of the individual passenger and maximising enjoyment of the cruise.

The system according to this invention allows the passenger to choose the type of entertainment, program it before the cruise, adapting it to the choices with which he wants to experience the cruise.

In this way, the entertainment package is fully "personalised", but experienced with a high level of technology provided by the cabin platform (audio, video, lighting, air conditioning and environment, and so on).

In other words, thanks to the information generated by the system according to this invention, the cabin is designed to be personalised and adapted by the passenger, allowing the passenger to create environments that are more personalised and easily associated with the various stages of life on board.

Furthermore, it is possible to maximise the useful time.

In fact, the presence of the crew has a high impact in the "accommodation" area, historically characterised by a relatively high level of quality offered.

The crew intervenes significantly in tidying up the room in the morning, the evening and is on-call during the day.

This theme is amplified by the trend of the new ships characterised by a high number of cabins that can characterise and distinguish numerous cruises with "exclusive"

services of butlers and private clubs in which the presence of both crew and carts for tidying up the rooms is not visually integrated and erodes the relaxing and pleasant atmosphere.

In the latest constructions, local systems have been introduced to monitor the occupation status of the cabins and passenger requests for tidying up the cabins, borrowing the typical offering of the hotel industry.

With the system according to this invention, it is possible for a central control unit to control the occupation status of the cabins to allow the crew to intervene unobtrusively and with maintenance times appropriate to the passenger profile.

These solutions take into account the peculiarities of the "cruise hotel" system that characterises and differentiates it from land-based systems through its own rhythms with which it develops the cruise and, for some sections, requires the guests to conform to common time periods and movements (breakfast, dinner, theatre, departure for excursions, returning from excursions).

Finally, it is possible to monitor and track the passenger.

In fact, the introduction of cabin entry and payment management devices, not only for administrative and safety reasons, but also aimed at minimising "dead" times and maximising the offer, adapted to typical cruise rhythms, is an aspect not to be underestimated.

In the system according to this invention, the cabin offers a non-invasive computer system detached from passenger safety services, which monitors the passenger through the local control unit and allows management of the data in the central control unit.

To the forms of embodiment of the system described above, a technician in the field, to satisfy contingent requirements, may make modifications, adaptations and replacements of members with others functionally equivalent, without departing from the scope of the following claims. Each of the characteristics described as belonging to a possible form of embodiment can be achieved independently from the other embodiments described.

The invention claimed is:

1. A system for controlling representative information about the use by one or more users of one or more habitable locations of a ship, said information comprising information representative of the occupation of one or more habitable locations by one or more users and information representative of the use of the services and amenities in one or more habitable locations by one or more users, the system comprising:
   a plurality of habitable locations, each habitable location comprising a plurality of electrical and/or electronic components controllable during the use of the habitable location by a user;
   a plurality of local control units, each local control unit of said plurality of local control units being operatively associated with at least one portion of habitable locations of the plurality of habitable locations of the ship, each local control unit being configured to control said at least one portion of habitable locations to which it is operatively connected;
   a central control unit; and
   a data communications network, each local control unit of said plurality of local control units being operatively associated with the central control unit via the data communications network,
   each local control unit being configured to detect from said plurality of electrical and/or electronic components and to provide the central control unit with information representative of the occupation of said at least one portion of habitable locations of the plurality of habitable locations of the ship and information representative of the use of the services and amenities in one or more habitable locations by one or more users of said at least one portion of habitable locations of the plurality of habitable locations of the ship, wherein the plurality of electrical and/or electronic components comprises a plurality of sensor nodes and a plurality of actuator nodes;
   the central control unit being configured to store said information representative of the occupation of said at least one portion of habitable locations of the plurality of habitable locations of the ship and said information representative of the use of the services and amenities in one or more habitable locations by one or more users of said at least one portion of habitable locations of the plurality of habitable locations of the ship received from each local control unit associated with said at least one portion of habitable locations of the plurality of habitable locations of the ship,
   the central control unit being configured to generate information representative of the status of said at least one portion of habitable locations of the plurality of habitable locations on the basis of said information representative of the occupation of said at least one portion of habitable locations of the plurality of habitable locations of the ship and said information representative of the use of the services and amenities in one or more habitable locations by one or more users of said at least one portion of habitable locations of the plurality of habitable locations of the ship;
   wherein the use, by a user, of one or more habitable locations of a ship comprises the occupation of the habitable location and the use of the services and amenities in the habitable location through a home automation command given through the use of electric and/or electronic devices distributed inside, outside, or in a vicinity of the habitable location.

2. The system according to claim 1, wherein the central control unit is configured to generate in real time information representative of the status of said at least one portion of habitable locations of the plurality of habitable locations on the basis of information representative of the use by a user of said at least one portion of habitable locations of the plurality of habitable locations of the ship.

3. The system according to claim 1, wherein the central control unit is configured to send commands to each local control unit to control said at least one portion of habitable locations to which the local control unit is operatively connected.

4. The system according to claim 1, wherein said at least one portion of habitable locations of the plurality of habitable locations of the ship is a single habitable location.

5. The system according to claim 1, wherein said at least one portion of habitable locations of the plurality of habitable locations of the ship is one or more reference zones of the ship comprising more than one habitable location.

6. The system according to claim 1, further comprising at least one electronic device, portable or fixed, of the user configured to control a single habitable location.

7. The system according to claim 1, wherein the plurality of electrical and/or electronic components of each habitable location is operatively connected to the local control unit of the respective habitable location via the data communications network.

8. The system according to claim 1, wherein each habitable location is a cabin of the ship.

9. A method for controlling representative information about the use by one or more users of one or more habitable locations of a ship, said information comprising information representative of the occupation of one or more habitable locations by one or more users and information representative of the use of the services and amenities in one or more habitable locations by one or more users, the method comprising steps of:

providing a plurality of habitable locations, each habitable location comprising a plurality of electrical and/or electronic components controllable during the use of the habitable location by a user, wherein the plurality of electrical and/or electronic components comprises a plurality of sensor nodes and a plurality of actuator nodes;

providing a plurality of local control units, each local control unit of said plurality of local control units being operatively associated with at least one portion of habitable locations of the plurality of habitable locations of the ship;

providing a central control unit;

providing a data communications network, each local control unit of said plurality of local control units being operatively associated with the central control unit via the data communications network;

detecting, by a local control unit of said plurality of local control units, information representative of the occupation of said at least one portion of habitable locations of the plurality of habitable locations of the ship and information representative of the use of the services and amenities in one or more habitable locations by one or more users of the habitable location from said plurality of electrical and/or electronic components;

providing, by a local control unit of said plurality of local control units, information representative of the occupation of said at least one portion of habitable locations of the plurality of habitable locations of the ship and information representative of the use of the services and amenities in one or more habitable locations by one or more users of the habitable location detected by said plurality of electrical and/or electronic components to the central control unit;

storing, by the central control unit, the information representative of the occupation of said at least one portion of habitable locations of the plurality of habitable locations of the ship and information representative of the use of the services and amenities in one or more habitable locations by one or more users of the habitable location received from each local control unit of said plurality of local control units associated with a habitable location of the ship; and     generating, by the central control unit, information representative of the status of a habitable location on the basis of the stored information representative of the occupation of said at least one portion of habitable locations of the plurality of habitable locations of the ship and information representative of the use of the services and amenities in one or more habitable locations by one or more users of the habitable location;

wherein the use, by a user, of one or more habitable locations of a ship comprises the occupation of the habitable location and the use of the services and amenities in the habitable location through a home automation command given through the use of electric and/or electronic devices distributed inside, outside, or in the vicinity of the habitable location.

10. The method according to claim 9, wherein the step of generating comprises a step of generating in real time, by the central control unit, the stored information representative of the use by a user of the habitable location.

11. The method according to claim 10, wherein the step of generating comprises a step of making available such information to third parties, by the central control unit, in real time.

* * * * *